United States Patent
Smith et al.

(10) Patent No.: US 6,695,106 B2
(45) Date of Patent: Feb. 24, 2004

(54) METHOD AND APPARATUS FOR IMPROVED VIBRATION ISOLATION

(75) Inventors: Michael R. Smith, Colleyville, TX (US); Frank B. Stamps, Colleyville, TX (US); Robert J. Pascal, Fort Worth, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

(21) Appl. No.: 09/965,114

(22) Filed: Sep. 26, 2001

(65) Prior Publication Data

US 2002/0060268 A1 May 23, 2002

Related U.S. Application Data

(60) Provisional application No. 60/235,656, filed on Sep. 26, 2000.

(51) Int. Cl.⁷ .............................. F16F 7/10; F16F 13/00
(52) U.S. Cl. .................... 188/378; 267/140.11
(58) Field of Search .................. 188/298, 322.15, 188/322.18, 317, 378, 322.22, 275; 267/140.14, 140.15, 35; 244/54; 248/562, 636

(56) References Cited

U.S. PATENT DOCUMENTS

| | | | |
|---|---|---|---|
| 4,236,607 A | | 12/1980 | Halwes et al. ............ 188/1 B |
| 4,725,019 A | * | 2/1988 | White ........................ 244/54 |
| 5,316,240 A | | 5/1994 | Girard et al. ............. 244/17.27 |
| 5,435,531 A | * | 7/1995 | Smith et al. ........... 267/140.11 |
| 5,439,082 A | | 8/1995 | McKeown et al. ......... 188/379 |
| 5,458,222 A | * | 10/1995 | Pla et al. .................... 188/378 |
| 5,732,905 A | | 3/1998 | Krysinski ................ 244/17.27 |
| 5,906,254 A | | 5/1999 | Schmidt et al. ............. 188/378 |
| 5,947,457 A | | 9/1999 | Swanson et al. ....... 267/140.14 |
| 5,957,440 A | | 9/1999 | Jones et al. ............ 267/140.14 |
| 6,009,983 A | | 1/2000 | Stamps et al. .............. 188/298 |
| 6,129,306 A | * | 10/2000 | Pham ............................ 244/2 |
| 6,293,532 B2 | * | 9/2001 | McGuire ............... 267/140.13 |

FOREIGN PATENT DOCUMENTS

JP          742773 A    *  2/1995

OTHER PUBLICATIONS

Dennis R. Halwes, "Total Main Rotor Isolation System", Nov. 1981, pp. 81–15–1—81–15–7.

* cited by examiner

Primary Examiner—Matthew C. Graham
Assistant Examiner—Melody M. Burch
(74) Attorney, Agent, or Firm—James E. Walton

(57) ABSTRACT

A tunable vibration isolator with active tuning elements having a housing which defines fluid chambers. A piston is disposed within the housing. A vibration isolation fluid is disposed within the fluid chambers. A passage having a predetermined diameter extends through the piston to permit the vibration isolation fluid to flow from one fluid chamber to the other. The tunable vibration isolator may employ either a solid tuning mass approach or a liquid tuning mass approach. In either case, active tuning elements, or actuators, are disposed in the fluid chambers to selectively tune the vibration isolator.

24 Claims, 12 Drawing Sheets

METHOD AND APPARATUS FOR IMPROVED VIBRATION ISOLATION

This application claims the benefit of U.S. Provisional Application No. 60/235,656, filed Sep. 26, 2000, titled "Method and Apparatus for Improved Vibration Isolation."

BACKGROUND

1. Field of the Invention

The present invention relates in general to active vibration control. Although there are methods of active vibration control in the time domain, the present invention is particularly related to a methodology of active vibration control in the frequency domain. The present invention relates generally to a method and apparatus for isolating mechanical vibrations in a structure or body which is subject to harmonic or oscillating displacements or forces, and is of particular utility in the field of aircraft, in particular, helicopters and other rotary wing aircraft.

2. Description of Related Art

For many years, effort has been directed toward the design of apparatus for isolating a vibrating body from transmitting its vibrations to another body. Such apparatus are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from dampening devices in the prior art that are erroneously referred to as "isolators." A simple force equation for vibration is set forth as follows:

$$F = m\ddot{x} + c\dot{x} + kx$$

A true vibration isolator utilizes acceleration of a fluid body $m\ddot{x}$ to cancel the displacement of vibration $kx$. On the other hand, a dampening device is concerned with restricting flow of a fluid or other body, and thus velocity $c\dot{x}$ and does not cancel vibration, but merely absorbs its frequency.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotary wing aircraft, such as tilt rotor aircraft, which are required to hover against the dead weight of the craft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters is disclosed in commonly assigned U.S. Pat. No. 4,236,607, titled "Vibration Suppression System," issued Dec. 2, 1980, to Halwes, et al. (Halwes '607). Halwes '607 is incorporated herein by reference. Halwes '607 discloses a vibration isolator in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in commonly assigned U.S. Pat. No. 5,439,082, titled "Hydraulic Inertial Vibration Isolator," issued Aug. 8, 1995, to McKeown, et al. (McKeown '082). McKeown '082 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in commonly assigned U.S. Pat. No. 6,009,983, titled "Method and Apparatus for Improved Isolation," issued Jan. 4, 2000, to Stamps et al. (Stamps '983). In Stamps '983, a compound radius at the each end of the tuning passage was employed to provide a marked improvement in the performance of the isolator. Stamps '983 is incorporated herein by reference.

SUMMARY OF THE INVENTION

Although the foregoing inventions represent great strides in the area of vibration isolation, certain shortcomings remain, in particular, the ability to actively tune the isolator.

Therefore, it is an object of the present invention to provide a vibration isolation system in which the isolator can be actively tuned.

It is another object of the present invention to provide a vibration isolator that allows active tuning of the isolator, as well as, simultaneous vibration treatment of multiple harmonics.

It is yet another object of the present invention to provide a vibration isolator that allows active tuning of the isolator, as well as, active "negative" damping which results in near zero vibration transmissibility.

These and other objectives are achieved by providing a tunable vibration isolator with active tuning elements having a housing which defines fluid chambers. A piston is disposed within the housing. A vibration isolation fluid is disposed within the fluid chambers. A passage having a predetermined diameter extends through the piston to permit the vibration isolation fluid to flow from one fluid chamber to the other.

The tunable vibration isolator may employ either a solid tuning mass approach or a liquid tuning mass approach. In either case, active tuning elements, or actuators, are disposed in the fluid chambers to selectively alter the dynamic characteristics of the vibration isolator.

Preferably, the relatively enlarged portion is defined by a compound radius which extends over a predetermined length of the passage.

Additional objectives, features and advantages will be apparent in the written description which follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
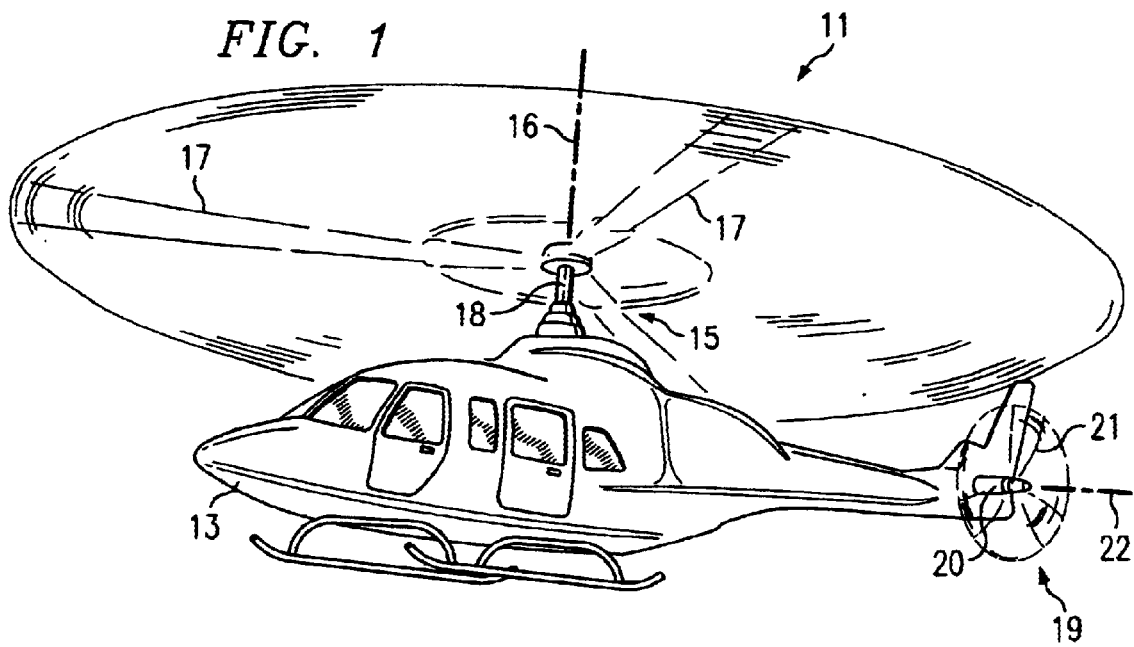
FIG. 1 is a perspective view of a helicopter according to the present invention.

Referring to FIG. 1 in the drawings, a helicopter 11 according to the present invention is illustrated. Helicopter 11 has a fuselage 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a longitudinal axis 16 of main rotor shaft 18. Tail rotor blades 21 generally rotate about a longitudinal axis 22 of tail rotor shaft 20. Helicopter 11 also includes a vibration isolation system according to the present invention for isolating fuselage 13 or other portions of helicopter 11 from mechanical vibrations, such as harmonic vibrations, which are associated with the propulsion system and which arise from the engine, transmission, and rotors of helicopter 11.

Figure 2A:
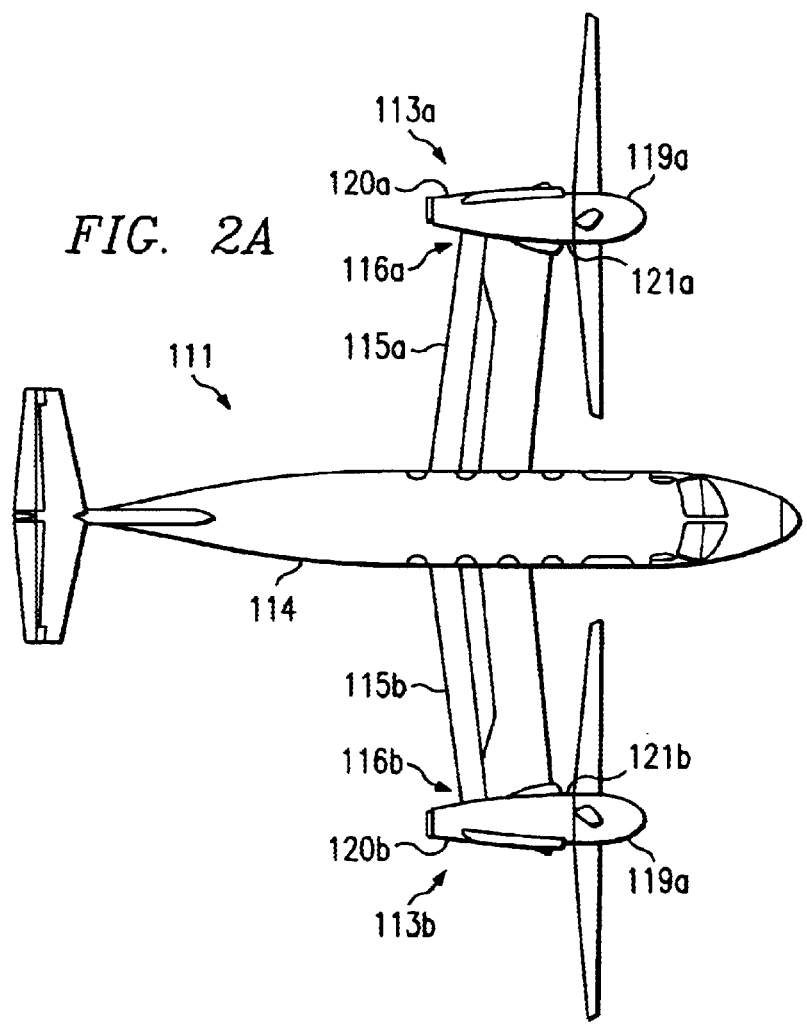
FIG. 2A is a plan view of a tilt rotor aircraft according to the present invention in an airplane mode.
Figure 2B:
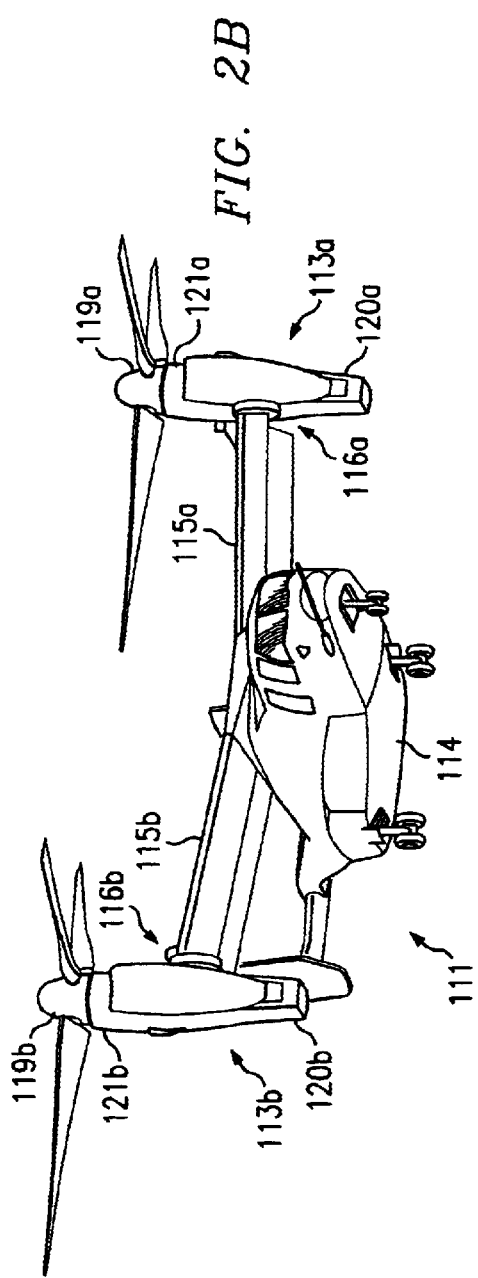
FIG. 2B is a perspective view of a tilt rotor aircraft according to the present invention in a helicopter mode.

The present invention may also be utilized on other types of rotary wing aircraft. Referring now to FIGS. 2A and 2B in the drawings, a tilt rotor aircraft 111 according to the present invention is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 also includes a vibration isolation system according to the present invention for isolating fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
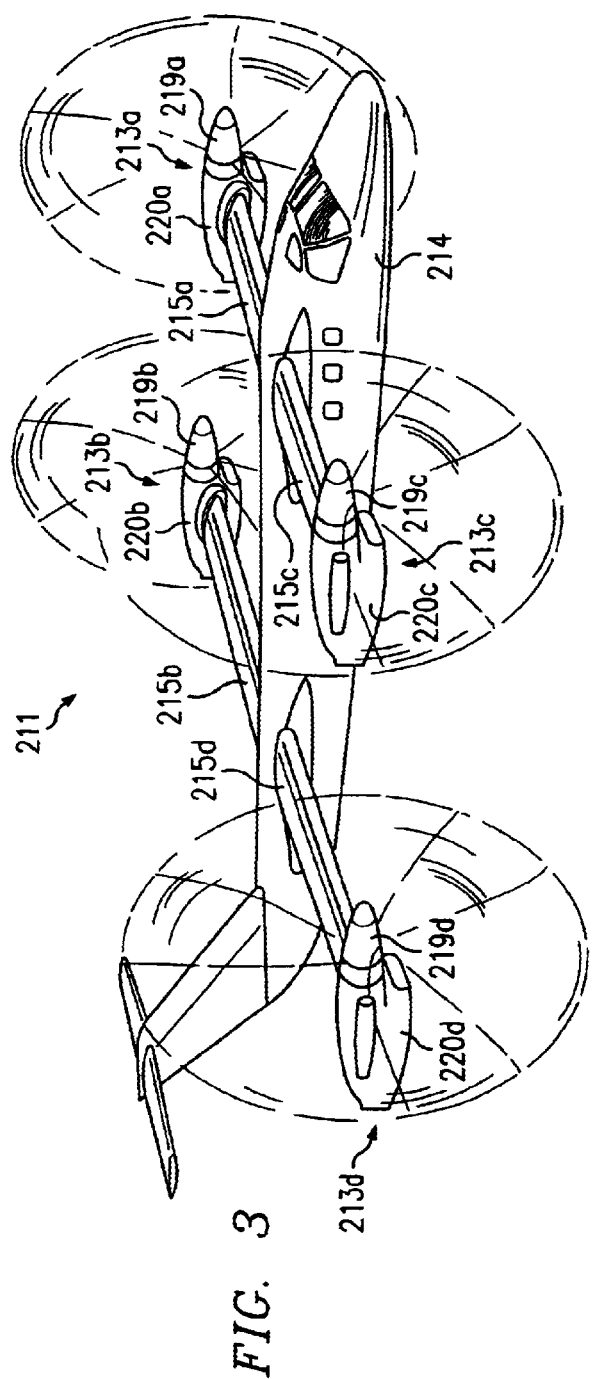
FIG. 3 is a perspective view of a quad tilt rotor aircraft according to the present invention in an airplane mode.

Referring now to FIG. 3 in the drawings, a quad tilt rotor aircraft 211 according to the present invention is illustrated. As with the tilt rotor aircraft of FIGS. 2A and 2B, rotor assemblies 213a, 213b, 213c, and 213d are carried by wings 215a, 215b, 215c, and 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Tilt rotor aircraft 211 also includes a vibration isolation system according to the present invention for isolating fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211.

It should be understood that the present invention may be used with any aircraft on which it would be desirable to have vibration isolation according to the present invention, including unmanned aerial vehicles that are remotely piloted.

Figure 4A:
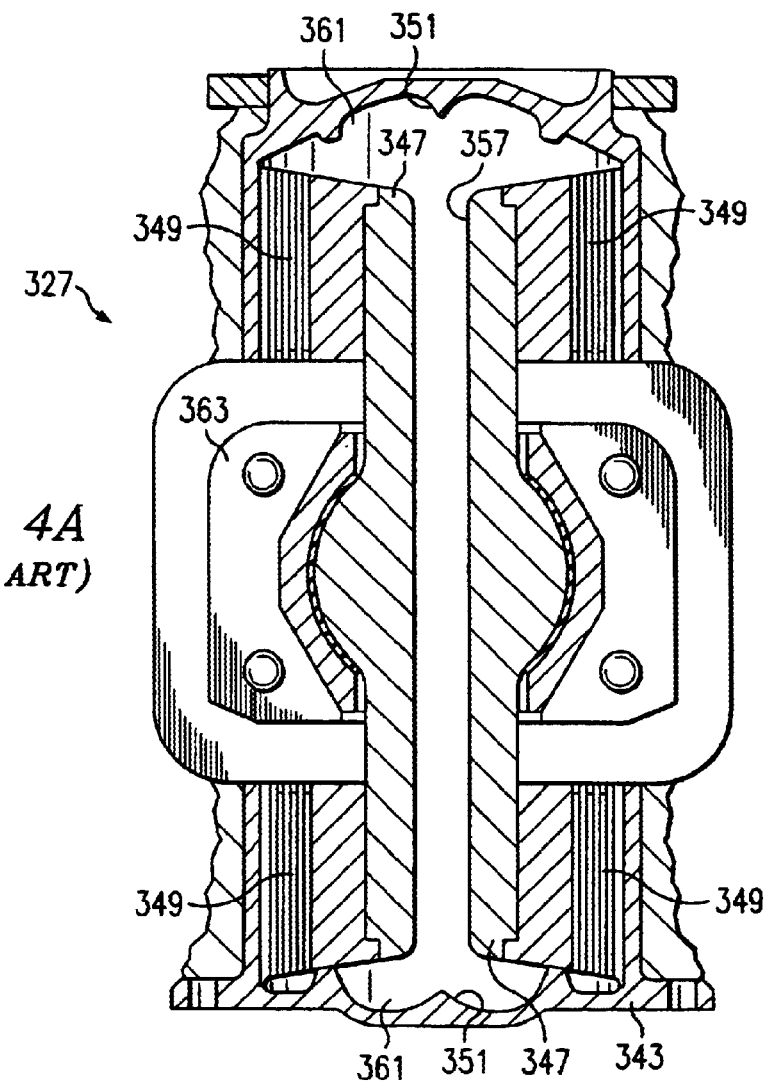
FIG. 4A is a cross-sectional view of a prior art liquid inertia vibration eliminator.

Referring now to FIG. 4A in the drawings, a prior art liquid inertia vibration eliminator (LIVE unit) 327 for use on an aircraft is illustrated. Prior art LIVE unit 327 includes a housing 343 that has a hollow, generally cylindrical interior. A piston 347 of selected cross-sectional diameter is disposed within the interior of housing 343. Housing 343 would typically be coupled to the fuselage of an aircraft (not shown) and piston 347 would typically be coupled to the transmission and propulsion system of the aircraft (not shown) via a pylon assembly at an attachment bracket 363. In such an arrangement, the fuselage serves as the body to be isolated from vibration, and the transmission of the aircraft serves as the vibrating body. An elastomeric seal and spring member 349 resiliently seals piston 347 within the interior of housing 343.

A fluid chamber 361 is defined by the interior of housing 343 and piston 347 and is sealed against leakage by elastomer member 349. A known-density, low-viscosity vibration-isolation fluid, also referred to as tuning fluid, is disposed within fluid chamber 361. In addition to sealing the vibration-isolation fluid in fluid chamber 361, elastomer member 349 functions as a spring to permit piston 347 to move or oscillate relative to housing 343, while maintaining piston 347 in a central location in housing 343 when no load is applied.

A tuning port or passage 357 extends centrally through piston 347 and permits the vibration-isolation fluid to move from one end of fluid chamber 361 to the other. A conical flow diverter 351 is provided at each end of housing 343 and is aligned with and generally opposes the opening at each end of tuning passage 357. Each conical flow diverter 351 enhances fluid flow by decelerating the vibration-isolation fluid as it flows from each end of the fluid chamber into and out of passage 357.

Figure 4B:
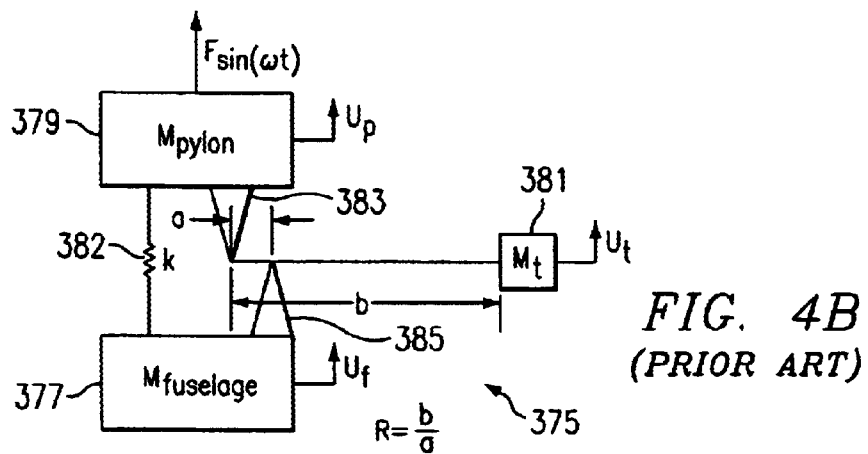
FIG. 4B is a force diagram of the prior art liquid inertia vibration eliminator of FIG. 4A.

Referring now to FIG. 4B in the drawings, a mechanical equivalent model 375 for the prior art LIVE unit 327 of FIG. 4A is illustrated. In mechanical equivalent model 375, a box 377 represents the mass of the fuselage $M_{fuselage}$; a box 379 represents the mass of the pylon assembly $M_{pylon}$; and a box 381 represents the mass of the tuning mass $M_t$, in this case, the vibration-isolation fluid. A vibratory force F sin(ωt) is generated by the engine, transmission, and propulsion system. Force F sin(ωt) is a function of the frequency of vibration of the transmission and propulsion system.

Force F sin(ωt) causes an oscillatory displacement $u_p$ of the pylon assembly; an oscillatory displacement of the fuselage $u_f$; and an oscillatory displacement of the tuning mass $u_t$. Elastomer member 349 is represented by a spring 382 disposed between the fuselage $M_{fuselage}$ and the pylon assembly $M_{pylon}$. Spring 382 has a spring constant k.

In mechanical equivalent model 375, tuning mass $M_t$ functions as if cantilevered from a first fulcrum 383 attached to the pylon assembly $M_{pylon}$, and a second fulcrum 385 attached to the fuselage $M_{fuselage}$. The distance a from first fulcrum 383 to second fulcrum 385 represents the cross-sectional area of tuning port 357, and the distance b from first fulcrum 383 to the tuning mass $M_t$ represents the cross-sectional area of piston 347, such that an area ratio, or hydraulic ratio, R is equal to the ratio of b to a.

As is evident, no means for actively tuning LIVE unit 327 is available. Once the cross-sectional areas of tuning passage 357 and piston 347 are determined, and the tuning fluid is chosen, the operation of LIVE unit 327 is set, and cannot be altered without altering one or more of these features. On the other hand, the present invention provides a means of actively tuning the functionality a LIVE unit during operation.

Figure 4C:
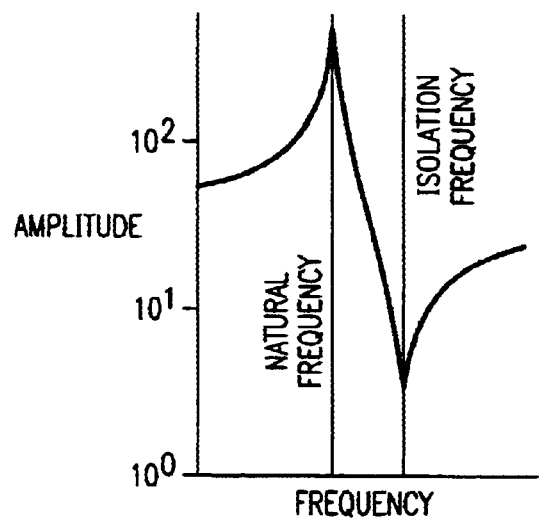
FIG. 4C is a plot of amplitude versus frequency for the prior art liquid inertia vibration eliminator of FIG. 4A.

Referring now to FIG. 4C in the drawings, a plot of amplitude versus frequency for LIVE unit 327 and mechanical equivalent model 375 is illustrated.

Figure 5A:
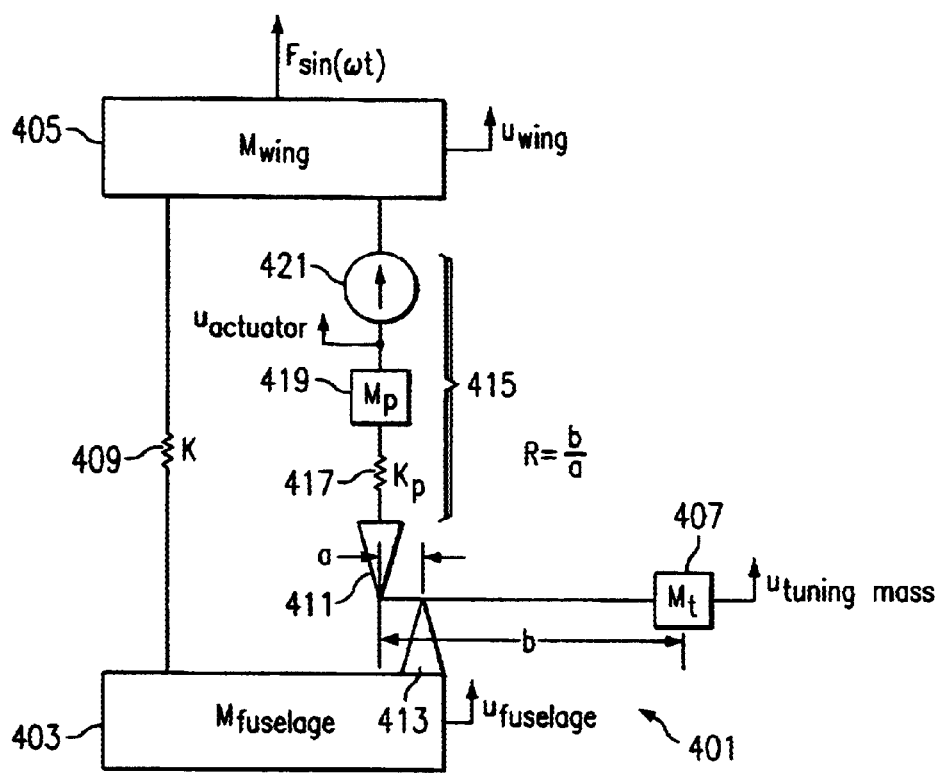
FIG. 5A is a mechanical equivalent model of the preferred embodiment of the tunable vibration isolator according to the present invention.

Referring now to FIG. 5A in the drawings, a mechanical equivalent model 401 for the tunable vibration isolator according to the present invention is illustrated. The tunable vibration isolator of the present invention is preferably used to isolate the vibration generated by the transmission and propulsion system of an aircraft, such as aircraft 11, 111, and 211, from the fuselage, such as fuselages 14, 114, and 214 (see FIGS. 1–3). However, it should be understood that although the tunable vibration isolator of the present invention is described herein with respect to an aircraft application, it may be used in any application in which it is desirable to isolate the vibration between one body and another. The following discussion of the preferred embodiment of the present invention will be with respect to an application of the tunable vibration isolator on quad tilt rotor aircraft 211 (see FIG. 3) to isolate the vibratory forces generated in wing member 215a from fuselage 214.

In mechanical equivalent model 401, fuselage 214 is represented as the mass of the fuselage $M_{fuselage}$, or box 403; wing member 215a is represented as the mass of the wing member $M_{wing}$, or box 405; and a box 407 represents the mass of the tuning mass $M_t$, which in the present invention may be either a rod disposed in a tuning port or merely vibration-isolation fluid disposed in the tuning port, as will be described in detail below. In the preferred embodiment, the tuning mass is a tungsten rod. A vibratory force F sin(ωt) is generated by the engine, transmission, and propulsion system carried by nacelle 220a at the tip of wing 215a. Force F sin(ωt) is a function of the frequency of vibration of the wing caused primarily by the transmission and propulsion system.

Force F sin(ωt) causes an oscillatory displacement $u_{wing}$ of the wing member $M_{wing}$; an oscillatory displacement $u_{fuselage}$ of the fuselage $M_{fuselage}$; and an oscillatory displacement $u_{tuning\ mass}$ of the tuning mass $M_t$. As with the prior art LIVE unit 327, a spring member, represented by a spring 409, is disposed between the fuselage $M_{fuselage}$ and the wing member $M_{wing}$. Spring 409 has a spring constant k. Spring 409 will be discussed in more detail below.

Tuning mass $M_t$ is operably associated with fuselage $M_{fuselage}$ and wing member $M_{wing}$. In mechanical equivalent model 401, tuning mass $M_t$ functions as if cantilevered from a first fulcrum 411 attached to wing member $M_{wing}$, and a second fulcrum 413 attached to the fuselage $M_{fuselage}$. The distance a from first fulcrum 411 to second fulcrum 413 represents the cross-sectional area of the tuning rod or port, and the distance b from first fulcrum 411 to the tuning mass $M_t$ represents the cross-sectional area of a piston (see FIG. 5B), such that an area ratio, or hydraulic ratio, R is equal to the ratio of b to a.

An active tuning element 415 is disposed between the wing member $M_{wing}$ and the tuning mass $M_t$. Active tuning element 415 functions to make fulcrum 411 vibrate. It should be understood that active tuning element 415 may represent a plurality of active tuning elements acting either together or independently. In the preferred embodiment, three pairs of active tuning elements are employed, as will be discussed in more detail below. In the preferred embodiment, active tuning element 415 is a piezoceramic element that oscillates in the range of about 16.6 Hz to 19.9 Hz to counteract the vibration of the wing member $M_{wing}$. It should be understood that active tuning element 415 may be comprised of other smart materials, such as magnetostrictive materials, or may comprise other means, such as electromagnetic, pneumatic, hydraulic, or other possible means.

Active tuning element 415 includes a spring element 417 having a spring constant $k_p$, a mass $M_p$, and a controllable force element 421. Controllable force element 421 may have any phase angle and be of any magnitude within the maximum capabilities of active tuning element 415. Active tuning element 415 also includes control circuitry (not shown) for controlling the actuation of active tuning element 415. Active tuning element 415 allows for selective actuation of the tuning fluid.

Figure 5B:
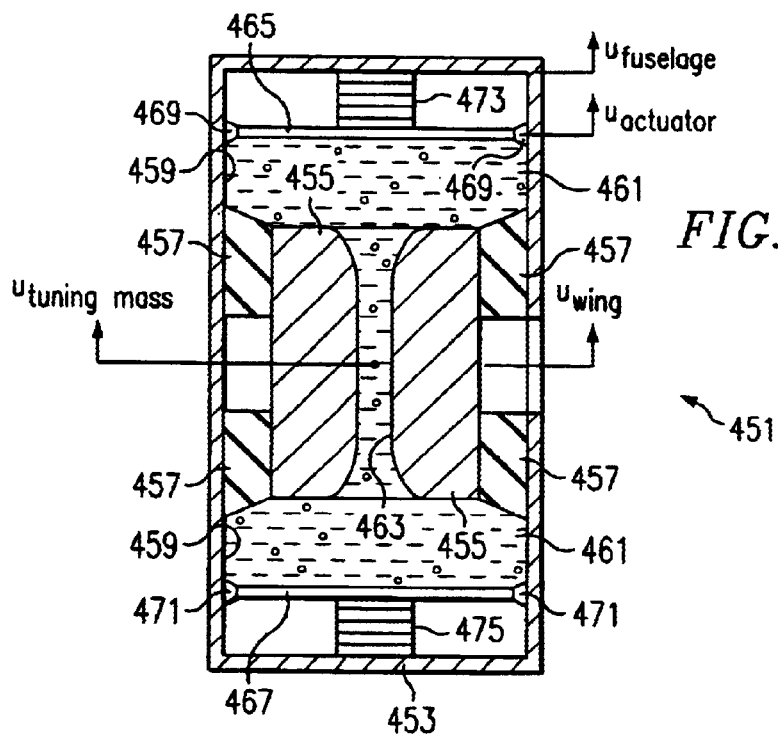
FIG. 5B is a simplified schematic shown in cross section of the tunable vibration isolator of FIG. 5A.

Referring now to FIG. 5B in the drawings, a simplified schematic of the preferred embodiment of a vibration isolator 451 according to the present invention is illustrated. Vibration isolator 451 includes a housing 453 having a hollow, generally cylindrical interior. Housing 453 would typically be coupled to the fuselage of the aircraft, i.e., the body being isolated from the vibration. A piston 455 of selected cross-sectional diameter is disposed within the interior of housing 453. Piston 455 would typically be coupled to the wing of the aircraft, i.e., the source of the vibration. A first elastomeric seal and spring member 457 resiliently seals piston 455 within the interior of housing 453.

A fluid chamber 459 is defined by the interior of housing 453 and piston 455. A known-density, vibration-isolation fluid 461, also referred to as tuning fluid, is disposed within fluid chamber 459. Tuning fluid 461 is preferably organic with non-corrosive properties having low-viscosity and high density. In addition to sealing tuning fluid 461 within fluid chamber 459, first elastomeric member 457 functions as a spring to permit piston 455 to move or oscillate relative to housing 453, while maintaining piston 455 in a central location within housing 453 when no load is applied. A tuning port 463 extends centrally through piston 455 and permits tuning fluid 461 to move from one end of fluid chamber 459 to the other.

A first actuating piston 465 is disposed within fluid chamber 461 at one end of vibration isolator 451. A second actuating piston 467 is disposed within fluid chamber 461 at the opposing end of vibration isolator 451. A second elastomeric seal and spring member 469 resiliently seals first actuating piston 465 within the interior of housing 453. In a similar fashion, a third elastomeric seal and spring member 471 resiliently seals second actuating piston 467 within the interior of housing 453. A first tunable active tuning element 473, operably associated with first actuating piston 465, is coupled to housing 453, in a similar fashion, a second tunable active tuning element 475, operably associated with second actuating piston 467, is also coupled to housing 453. First and second active tuning elements 473, 475 are each electrically coupled to control circuitry (not shown) for controlling the actuation of first and second actuating pistons 465, 467, respectively.

In this simplified representation, the engine, transmission, and propulsion system produce oscillatory forces which are transmitted through the wing member causing an oscillatory displacement $u_{wing}$ of piston 455. The displacement $u_{wing}$ of piston 455 is transmitted through elastomeric member 457 to the fuselage of the aircraft via housing 453 resulting in a displacement $u_{fuselage}$. Tuning fluid 461 within tuning port 463 opposes the oscillatory displacement $u_{wing}$ of the piston 455 with a displacement $u_{tuning\ mass}$ of tuning fluid 461. In addition, first and second active tuning elements 473, 475 are controlled by the control circuitry to selectively actuate first and second actuation pistons 465, 467 resulting in displacements $u_{actuator}$ of first and second actuating pistons 465, 467. Actuation of first and second actuating pistons 465, 467 at a selected frequency and amplitude amplifies the displacement $u_{tuning\ mass}$ of tuning fluid 461 and cancels out the frequency of the oscillatory forces from the wing member. In this manner the oscillatory vibration from the engine, transmission, and propulsion are not transferred through the wing member to the fuselage.

Figure 6A:
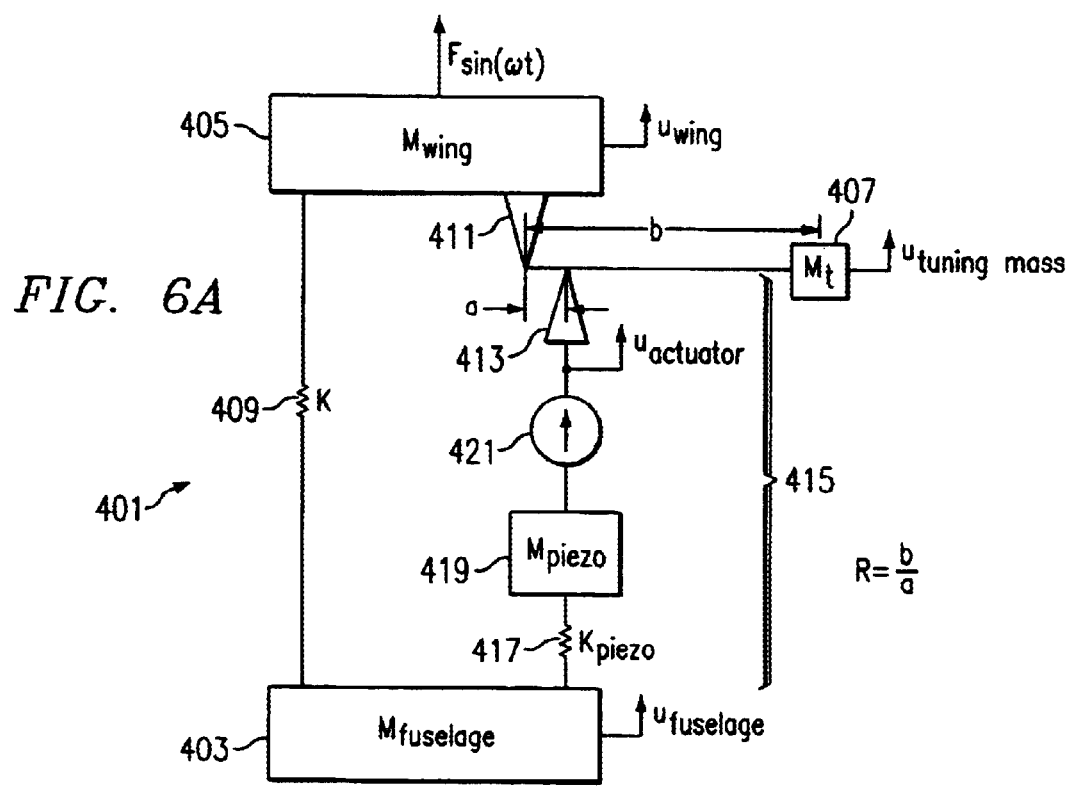
FIG. 6A is a mechanical equivalent model of an alternate embodiment of the tunable vibration isolator according to the present invention.

It should be understood that the location of active tuning element 415 does not affect its functionality. This concept is illustrated with respect to FIGS. 6A and 6B. In FIG. 6A, mechanical equivalent model 401 is again illustrated. The only difference in mechanical equivalent model 401 between FIG. 5A and FIG. 6A is the location of active tuning element 415. In FIG. 5A, active tuning element 415 is disposed between the wing member $M_{wing}$ and the tuning mass $M_t$; however, in FIG. 6A, active tuning element 415 is disposed between the fuselage $M_{fuselage}$ and the tuning mass $M_t$. In other words, active tuning element 415 may act on either the vibrating body or the body to be isolated from vibration. The equation of motion for the system of FIG. 6A is exactly the same as the equation of motion for the system of FIG. 5A.

Figure 6B:
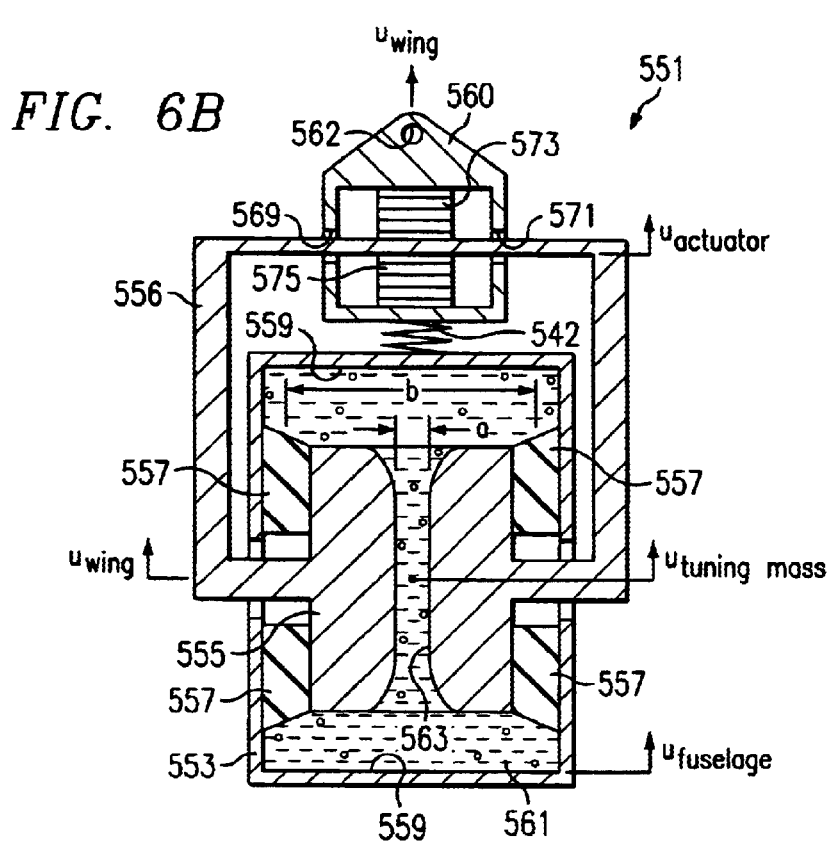
FIG. 6B is a simplified schematic shown in cross section of the tunable vibration isolator of FIG. 6A.

Referring now to FIG. 6B in the drawings, a simplified schematic of an alternate embodiment of a vibration isolator 551 according to the present invention is illustrated. Vibration isolator 551 includes a housing 553 having a hollow, generally cylindrical interior. Housing 553 would typically be coupled to the fuselage of the aircraft, i.e., the body being isolated from the vibration. A piston 555 of selected cross-sectional diameter is disposed within the interior of housing 553. Piston 555 would typically be coupled to the wing of the aircraft, i.e., the source of the vibration, via a mounting bracket 556 extends outside of and around housing 553. A first elastomeric seal and spring member 557 resiliently seals piston 555 within the interior of housing 553.

A fluid chamber 559 is defined by the interior of housing 553 and piston 555. A known-density, vibration-isolation fluid 561, similar in form and function to tuning fluid 461, is disposed within fluid chamber 559. Tuning fluid 561 is preferably organic with non-corrosive properties having low-viscosity and high density. In addition to sealing tuning fluid 561 within fluid chamber 559, first elastomeric member 557 functions as a spring to permit piston 555 to move or oscillate relative to housing 553, while maintaining piston 555 in a central location within housing 553 when no load is applied. A tuning port 563 extends centrally through piston 555 and permits tuning fluid 561 to move from one end of fluid chamber 559 to the other.

An actuation assembly 560 is coupled to the wing of the aircraft at a mounting point 562. A first tunable active tuning element 573 is disposed within actuation assembly 560, such that first active tuning element 573 may act upon mounting bracket 556 in one direction, preferably coaxial with tuning port 563. In a similar fashion, a second tunable active tuning element 575 is disposed within actuation assembly 560, such that second active tuning element may act upon mounting bracket 556 in an opposing direction to that of first active tuning element 577. Apertures 569 and 571 through actuation assembly 560 allow movement of mounting bracket 556 relative to actuation assembly 560. Actuation assembly 560 is coupled to mounting bracket 556 via a spring 542. Because first and second active tuning elements 573, 575 act upon mounting bracket 556, the actuation of first and second active tuning elements 573, 575 are transferred through mounting bracket 556 to piston 555. First and second active tuning elements 573, 575 are each electrically coupled to control circuitry (not shown) for controlling the actuation of mounting bracket 556.

In this simplified representation, the engine, transmission, and propulsion system produce oscillatory forces which are transmitted through the wing member causing an oscillatory displacement $u_{wing}$ of piston 555. The displacement $u_{wing}$ of piston 555 is transmitted through elastomeric member 557 to the fuselage of the aircraft via housing 553 resulting in a displacement $u_{fuselage}$. Tuning fluid 561 within tuning port 563 opposes the oscillatory displacement $u_{wing}$ of the piston 555 with a displacement $u_{tuning\ mass}$ of tuning fluid 561. In addition, first and second active tuning elements 573, 575 are controlled by the control circuitry to selectively actuate mounting bracket 556 resulting in a displacement $u_{actuator}$ of actuation assembly 560. Actuation of actuation assembly at a selected frequency and amplitude amplifies the displacement $u_{tuning\ mass}$ of tuning fluid 561 and cancels out the frequency of the oscillatory forces from the wing member. In this manner the oscillatory vibration from the engine, transmission, and propulsion are not transferred through the wing member to the fuselage.

Figure 7A:
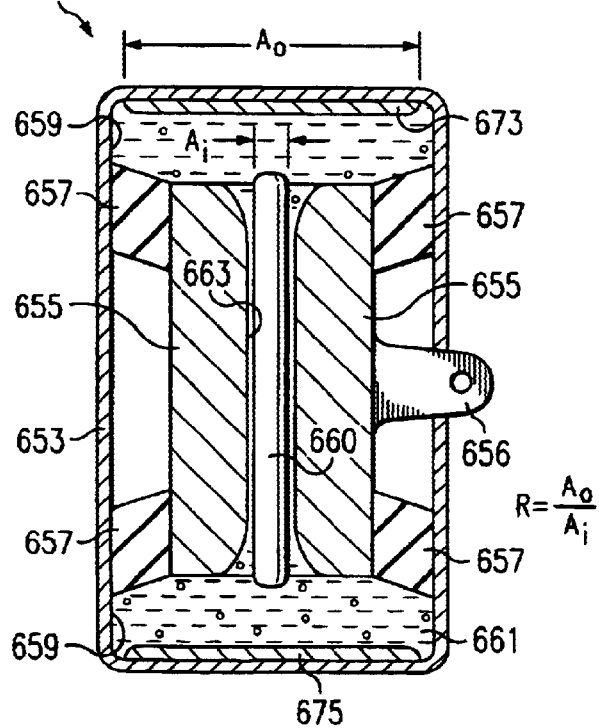
FIG. 7A is a simplified schematic shown in cross section of another alternate embodiment of the tunable vibration isolator according to the present invention.

Referring now to FIGS. 7A–7D in the drawings, simplified schematics of additional alternate embodiments of the vibration isolator according to the present invention are illustrated. In FIG. 7A, a simplified schematic of a vibration isolator 651 according to the present invention is illustrated. Vibration isolator 651 includes a housing 653 having a hollow, generally cylindrical interior. Housing 653 would typically be coupled to the fuselage of the aircraft, i.e., the body being isolated from the vibration. A piston 655 of selected cross-sectional diameter is disposed within the interior of housing 653. Piston 655 would typically be coupled to the wing of the aircraft, i.e., the source of the vibration, via a pylon mounting bracket 656. A first elastomeric seal and spring member 657 resiliently seals piston 655 within the interior of housing 653.

A fluid chamber 659 is defined by the interior of housing 653 and piston 655. A known-density, vibration-isolation tuning fluid 661 is disposed within fluid chamber 659. In addition to sealing tuning fluid 661 within fluid chamber 659, first elastomeric member 657 functions as a spring to permit piston 655 to move or oscillate relative to housing 653, while maintaining piston 655 in a central location within housing 653 when no load is applied. A tuning port 663 extends centrally through piston 655 and permits tuning fluid 661 to move from one end of fluid chamber 659 to the other. A tuning mass, or tuning rod 660, is disposed within tuning port 663. Tuning rod 660 oscillates within tuning port in response to oscillatory movement of piston 655 and tuning fluid 661. A plurality of optional bypass ports (not shown) through piston 655 restrict the axial motion of tuning rod 660.

A first tunable active tuning element 673 is disposed within housing 653 at one end of fluid chamber 659. In a similar fashion, a second active tuning element 675 is disposed within housing 653 at an opposing end of fluid chamber 659. A hydraulic ratio R is equal to the ratio of the area $A_o$ of first and second active tuning elements 673, 675 to the area $A_i$ of tuning port 663.

Figure 7B:
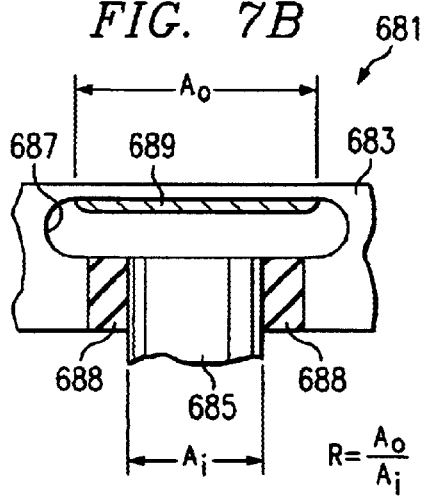
FIG. 7B is a simplified schematic shown in cross section of another alternate embodiment of the tunable vibration isolator according to the present invention.

In FIG. 7B, a simplified schematic for another vibration isolator 681 according to the present invention is illustrated. Vibration isolator 681 includes a housing 683 having a hollow, generally cylindrical interior. Housing 683 would typically be coupled to the fuselage of the aircraft, i.e., the body being isolated from the vibration. A piston 685 of selected cross-sectional diameter $A_i$ is disposed within the interior of housing 683. In this embodiment, piston 685 would typically be coupled to the floor of the aircraft, i.e., the source of the vibration. An elastomeric seal and spring member 687 resiliently seals piston 685 within the interior of housing 683.

A fluid chamber 687 is defined by the interior of housing 683 and piston 685. A known-density, vibration-isolation tuning fluid 689 is disposed within fluid chamber 687. In addition to sealing tuning fluid 689 within fluid chamber 687, elastomeric member 687 functions as a spring to permit piston 685 to move or oscillate relative to housing 683, while maintaining piston 685 in a central location within housing 683 when no load is applied.

A tunable active tuning element 689 is disposed within housing 683 at one end of fluid chamber 687. Active tuning element 689 has a cross-sectional area $A_o$. A hydraulic ratio R is equal to the ratio of the cross-sectional area $A_o$ of active tuning element 689 to the cross-sectional area $A_i$ of piston 685. In this embodiment, there is no tuning port. Piston 685 serves as the tuning mass, and active tuning element 689 acts upon piston 685 via tuning fluid 689 to counteract oscillatory forces transferred to piston 685 by the floor of the aircraft.

Figure 7C:
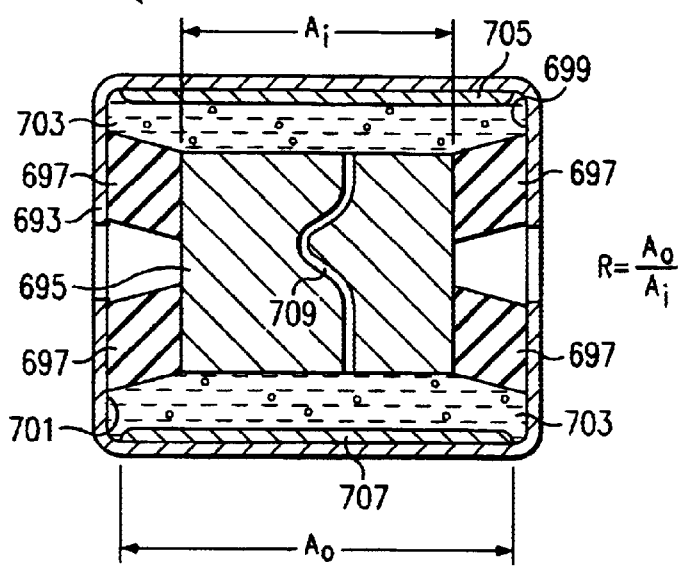
FIG. 7C is a simplified schematic shown in cross section of another alternate embodiment of the tunable vibration isolator according to the present invention.

In FIG. 7C, a simplified schematic for another vibration isolator 691 according to the present invention is illustrated. Vibration isolator 691 is configured from two vibration isolators 681 placed end to end. Vibration isolator 691 a housing 693 having a hollow, generally cylindrical interior. Housing 693 would typically be coupled to the fuselage of the aircraft, i.e., the body being isolated from the vibration. A piston 695 of selected cross-sectional diameter $A_i$ is disposed within the interior of housing 693. In this embodiment, piston 695 would typically be coupled to the floor of the aircraft, i.e., the source of the vibration. An elastomeric seal and spring member 697 resiliently seals piston 695 within the interior of housing 683.

A first fluid chamber 699 is defined by the interior of housing 693 and piston 695. Likewise, a second fluid chamber 701 is defined by the interior of housing 693 and piston 695. A known-density, vibration-isolation tuning fluid 703 is disposed within fluid chambers 699 and 701. In addition to sealing tuning fluid 703 within fluid chambers 699, 701, elastomeric member 697 functions as a spring to permit piston 695 to move or oscillate relative to housing 693, while maintaining piston 695 in a central location within housing 693 when no load is applied.

A first tunable active tuning element 705 is disposed within housing 693 at one end of fluid chamber 699. In a similar fashion, a second tunable active tuning element 707 is disposed within housing 693 at the opposing end of fluid chamber 701. Active tuning elements 705, 707 have a cross-sectional area $A_o$. A hydraulic ratio R is equal to the ratio of the cross-sectional area $A_o$ of active tuning elements 705, 707 to the cross-sectional area $A_i$ of piston 695. In this embodiment, there is no tuning port. Piston 695 serves as the tuning mass, and active tuning elements 705, 707 act upon piston 695 via tuning fluid 703 to counteract oscillatory forces transferred to piston 695 by the floor of the aircraft. An optional small passage 709 may pass through piston 695 so as to place fluid chamber 699 into fluid communication with fluid chamber 701. Passage 709 allows for mean shifts of piston 695.

Figure 7D:
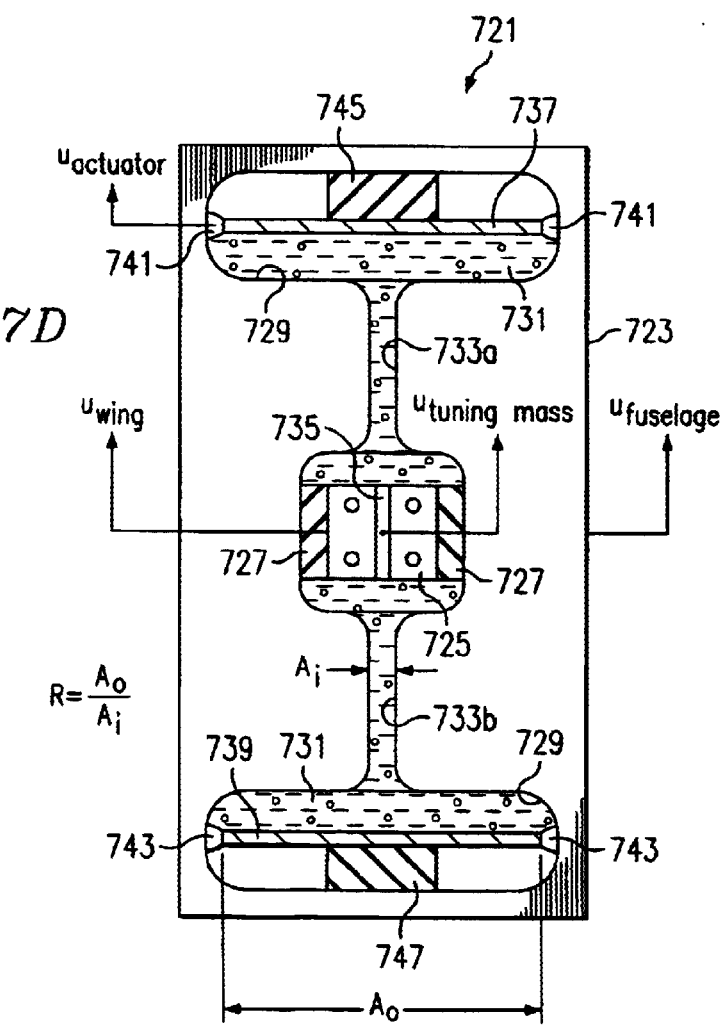
FIG. 7D is a simplified schematic shown in cross section of another alternate embodiment of the tunable vibration isolator according to the present invention.

In FIG. 7D, a simplified schematic for another vibration isolator 721 according to the present invention is illustrated. Vibration isolator 721 is similar to vibration isolator 451 of FIG. 5B with the exception that the piston assembly is configured differently. Vibration isolator 721 includes a housing 723 having a hollow, generally cylindrical interior. Housing 723 would typically be coupled to the fuselage of the aircraft, i.e., the body being isolated from the vibration. A piston 725 of selected cross-sectional diameter is disposed within the interior of housing 723. Piston 725 would typically be coupled to the wing of the aircraft, i.e., the source of the vibration. A first elastomeric seal and spring member 727 resiliently seals piston 725 within the interior of housing 723.

A fluid chamber 729 is defined by the interior of housing 723 and piston 725. A known-density, vibration-isolation fluid 731, also referred to as tuning fluid, is disposed within fluid chamber 729. Tuning fluid 731 is preferably organic with non-corrosive properties having low-viscosity and high density. Fluid chamber 729 includes central fluid channels 733a and 733b on either side of piston 725.

In addition to sealing tuning fluid 731 within fluid chamber 729, first elastomeric member 727 functions as a spring to permit piston 725 to move or oscillate relative to housing 723, while maintaining piston 725 in a central location within housing 723 when no load is applied. A tuning port 735 extends centrally through piston 725 and permits tuning fluid 731 to move from one end of fluid chamber 729 to the other. In such an embodiment, tuning port 735 might have a diameter of about 0.03 inches.

A first actuating piston 737 is disposed within fluid chamber 729 at one end of vibration isolator 721. A second actuating piston 739 is disposed within fluid chamber 729 at the opposing end of vibration isolator 721. A second elastomeric seal and spring member 741 resiliently seals first actuating piston 737 within the interior of housing 723. In a similar fashion, a third elastomeric seal and spring member 743 resiliently seals second actuating piston 739 within the interior of housing 723. A first tunable active tuning element 745, operably associated with first actuating piston 737, is coupled to housing 723. In a similar fashion, a second tunable active tuning element 747, operably associated with second actuating piston 739, is also coupled to housing 723. First and second active tuning elements 745, 747 are each electrically coupled to control circuitry (not shown) for controlling the actuation of first and second actuating pistons 737 and 739, respectively.

In this simplified representation, the engine, transmission, and propulsion system produce oscillatory forces which are transmitted through the wing member causing an oscillatory displacement $u_{wing}$ of piston 725. The displacement $u_{wing}$ of piston 725 is transmitted through elastomeric member 727 to the fuselage of the aircraft via housing 723 resulting in a displacement $u_{fuselage}$. Tuning fluid 731 within tuning channels 733a and 733b, and within tuning port 735 opposes the oscillatory displacement $u_{wing}$ of the piston 725 with a displacement $u_{tuning\ mass}$ of tuning fluid 731. In addition, first and second active tuning elements 745, 747 are controlled by the control circuitry to selectively actuate first and second actuation pistons 737, 739 resulting in displacements $u_{actuator}$ of first and second actuating pistons 737, 739. Actuation of first and second actuating pistons 737, 739 at a selected frequency and amplitude amplifies the displacement $u_{tuning\ mass}$ of tuning fluid 731 and cancels out the frequency of the oscillatory forces from the wing member. In this manner the oscillatory vibration from the engine, transmission, and propulsion are not transferred through the wing member to the fuselage.

In particular, the embodiments of FIGS. 7C and 7D provide a unique capability of eliminating high steady pressure from active tuning elements 705, 707, 745, and 747 by segregating the large steady mean pressure from the oscillatory pressure. This allows active tuning elements 705, 707, 745, and 747 to operate more efficiently by staying within the allowed pressures for the materials used to form active tuning elements 705, 707, 745, and 747. Without such means, high steady pressures could be introduced due to ground-air-ground cycles in which the pylon or wing member starts at rest compressing the vibration isolator. A lift is increased, the load is lifted to a zero compressive loads and then further such that the fuselage is suspended from the vibration isolator, placing the vibration isolator in tension. This results in very large mean pressures. For example, if active tuning element 705, 707, 745, or 747 is a piezoceramic material, it would have a maximum operating pressure of about 2,000 to 4,000 pounds per square inch. By eliminating the large mean pressure shift, the active tuning elements 705, 707, 745, and 747 can operate more efficiently without failing.

Figure 8:
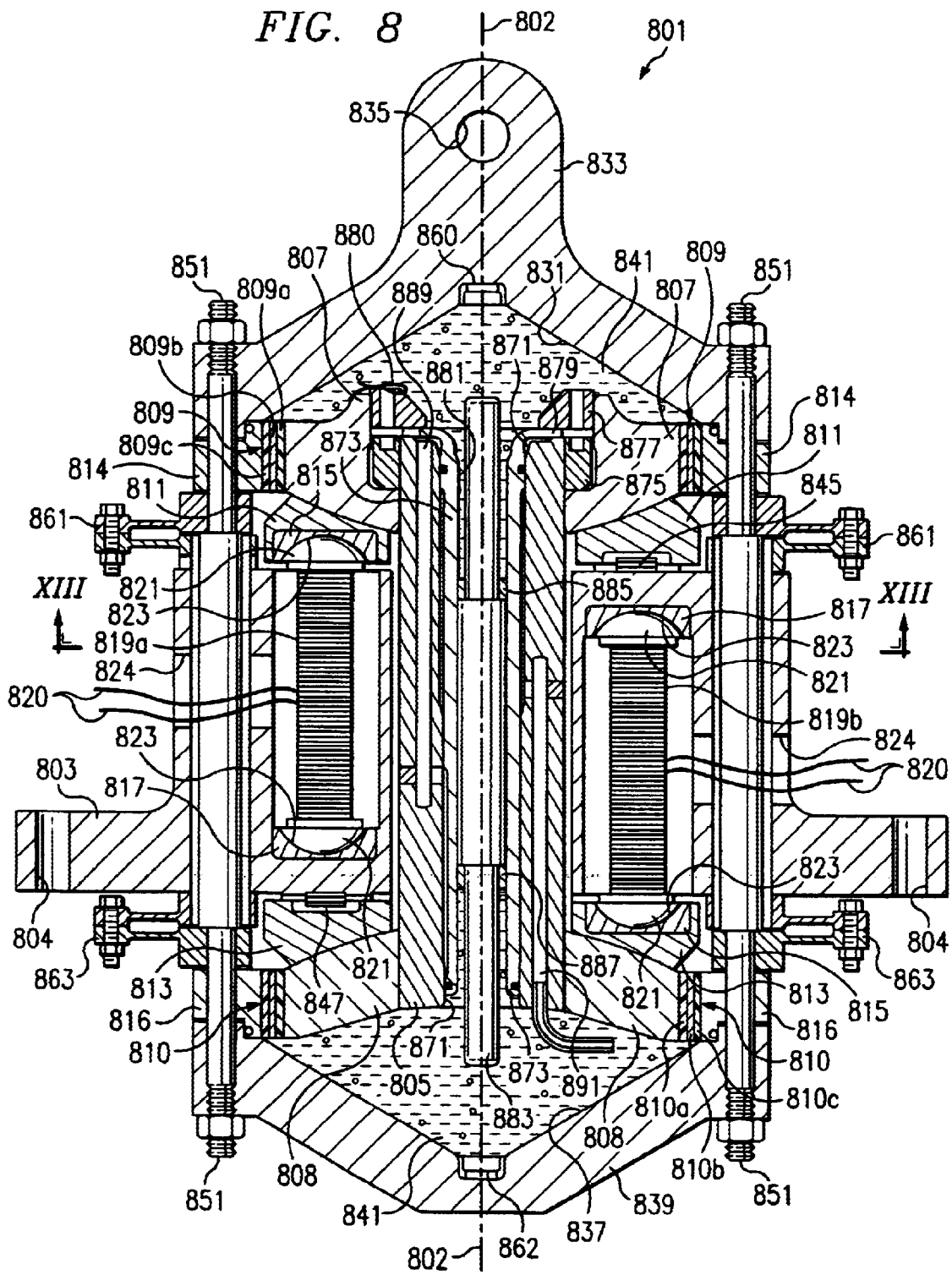
FIG. 8 is a cross-sectional view of the preferred embodiment of the tunable vibration isolator according to the present invention.
Figure 13:
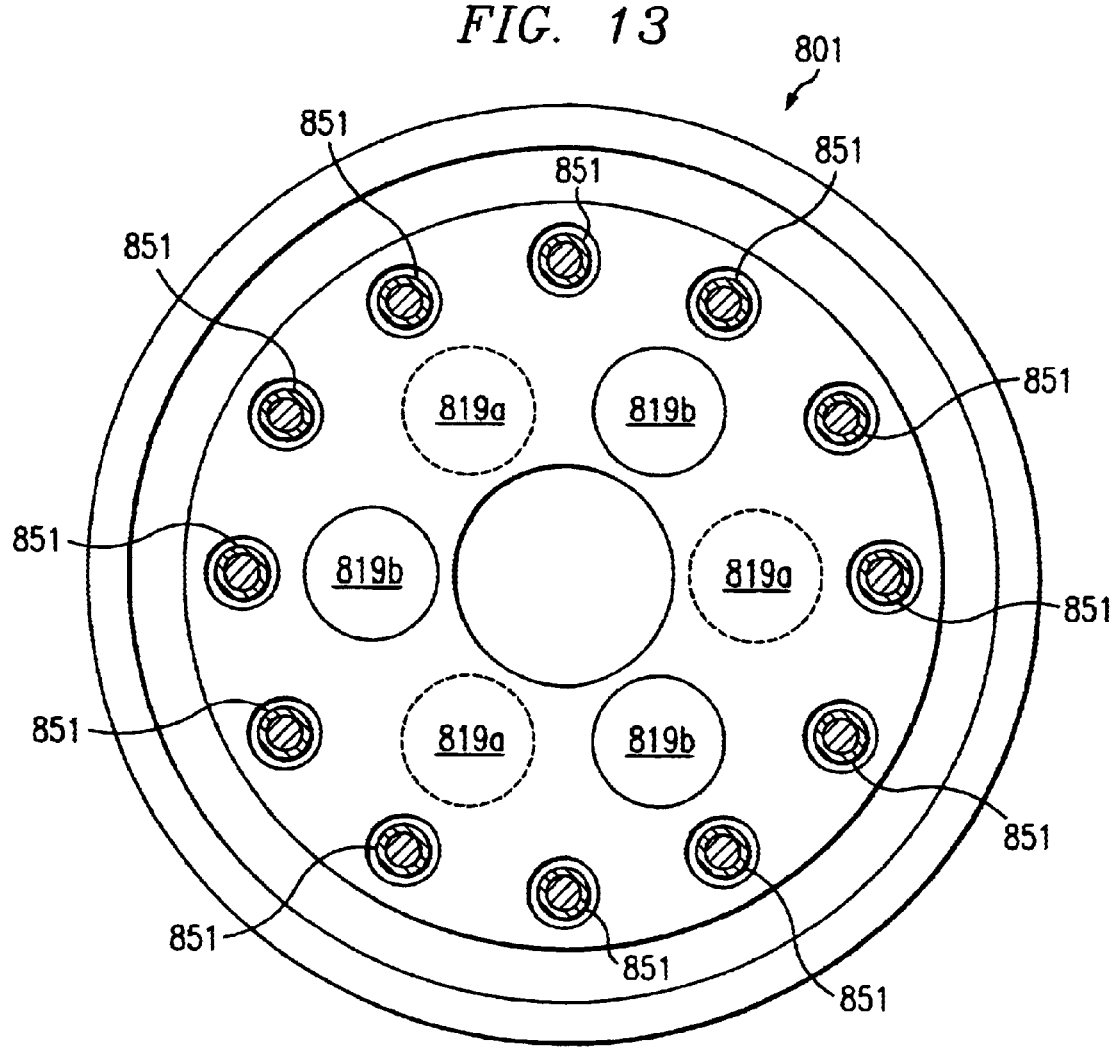
FIG. 13 is a cross-sectional schematic showing the arrangement of the two sets of three active tuning elements according to the present invention.

Referring now to FIGS. 8 and 13 in the drawings, the preferred embodiment of a physical configuration of a vibration isolator 801 according to the present invention is illustrated in a cross-sectional view. Although vibration isolator 801 will be described herein with reference to "upper" components and "lower" components, it will be understood that vibration isolator 801 functions independent of its orientation. Vibration isolator 801 is installed on aircraft 11, 111, or 211. Vibration isolator 801 includes a housing 803 having a hollow, generally cylindrical interior having a longitudinal axis 802. Housing 803 is coupled to the fuselage of the aircraft, i.e., the body being isolated from the vibration, at mounting apertures 804. A piston 805 of selected cross-sectional diameter is disposed within the interior of housing 803. Piston 805 is coupled to the wing members of the aircraft, i.e., the source of the vibration, as will be explained below. Piston 805 includes an upper convex flange 807 and an opposing lower convex flange 808.

Upper convex flange 807 is coupled to an upper elastomeric seal member 809, and lower convex flange 808 is coupled to a lower elastomeric seal member 810. Upper and lower elastomeric seal members 809 and 810 include inner steel rings 809a and 810a for coupling to upper and lower convex flanges 807 and 808 of piston 805, central elastomeric seals 809b and 810b to seal a tuning fluid 812 within vibration isolator 801, and outer steel rings 809c and 810c for coupling to an upper spacer 814 and a lower spacer 816, respectively. Preferably, upper and lower elastomeric seal members 809 and 810 each have an effective diameter of about 6.00 inches.

An upper fluid chamber 831 is generally defined by upper convex flange 807, upper elastomeric seal member 809, and an upper cap 833. Upper cap 833 includes a mounting aperture 835 for coupling vibration isolator 801 to the wing member of the aircraft. In a similar fashion, a lower fluid chamber 837 is generally defined by lower convex flange 808, lower elastomeric seal member 810, and a lower cap 839. A vibration isolation fluid, or tuning fluid, 841 fills upper and lower fluid chambers 831 and 837. Tuning fluid 841 is preferably a silicone oil with a kinematic viscosity of about 5 centipoise. Such a tuning fluid 841 provides good lubricity with a density of about 0.035 lb/in$^3$ (specific gravity of 0.916). Having a virtually incompressible liquid with reasonably low density reduces the parasitic weight in upper and lower fluid chambers 831 and 837.

An upper concave plate 811 is matingly in force transference contact with upper convex flange 807. In a similar fashion, an opposing lower concave plate 813 is matingly in force transference contact with lower convex flange 808. Upper and lower concave plates 811 and 813 are configured to receive a plurality of piston receiver plates 815. In a similar fashion, housing 803 is configured to receive a plurality of housing receiver plates 817. Piston receiver plates 815 and housing receiver plates 817 are paired together, such that each pair receives one of a plurality of active tuning elements 819a and 819b. Active tuning elements are electrically coupled to and controlled by control circuitry (not shown) via electrical leads 820 which pass through apertures 824 in housing 803. In the preferred embodiment, active tuning elements 819a and 819b are piezoceramic elements that oscillate in the range of about 16.6 Hz to about 19.9 Hz to counteract the vibration of the wing member. It should be understood that active tuning elements 819a and 819b may be comprised of other smart materials, such as magnetostrictive, or may comprise other means, such as electromagnetic, pneumatic, hydraulic, or other possible means.

It is desirable that active tuning elements 819a and 819b act in a longitudinal direction only. Therefore, in the preferred embodiment of the present invention, six active tuning elements are spatially aligned around vibration isolator 801, such that three extend downward from the upper portion of housing 803, i.e., 819b; and three extend upward from the lower portion of housing 803, i.e., 819a. Because three points define a plane, the mating of upper and lower concave plates 811 and 813 to upper and lower convex flanges 807 and 808 of piston 805 serves to equalize the load between the three pairs of active tuning elements 819a and 819b. Loads in active tuning elements 819a and 819b remain essentially axial along axis 802, thereby minimizing moments. To further reduce undesirable moments, each active tuning element 819a and 819b includes a hemispherical end cap 821 on each end; and a thin elastomeric layer interface 823 is disposed between each end cap 821 and each piston receiver plate 815 and each housing receiver plate 817. In addition, an upper anti-rotation flexure 845 is disposed between and coupled to housing 803 and upper concave plate 811. Likewise, a lower anti-rotation flexure 847 is disposed between and coupled to housing 803 and lower concave plate 813. Anti-rotation flexures 845 and 847 are preferably steel strips which ensure that upper and lower concave plates 811 and 813 may move in the axial direction relative to housing 803, but may not rotate relative to housing 803.

The spring force between housing 803 and piston 805 is provided by an upper spring plate assembly 861 and a lower spring plate assembly 863. Upper and lower spring plate assemblies 861 and 863 provide a stiffness of about 300,000 pounds per inch. Upper and lower spring plate assemblies 861 and 863 are configured to allow piston 805 to oscillate in the axial direction relative to housing 803.

The components of vibration isolator 801 are resiliently held together by a plurality of fasteners 851 which align and clamp together lower cap 839, lower spacer 816, lower spring plate assembly 863, housing 803, upper spring plate assembly 861, upper spacer 814, and upper cap 833. An upper vent 860 allows access to tuning fluid 841 within upper fluid chamber 831. In a similar fashion, a lower vent 862 allows access to tuning fluid 841 within lower fluid chamber 837.

A central channel 871 extends axially through the center of piston 805. In the preferred embodiment, central channel 871 receives a tubular shaft 873. Tubular shaft 873 is retained within tuning central channel 871 by clamping a flange portion 879 between retaining rings 875 and 877. A pin 879 may be used to secure retaining ring 877 in place.

Tubular shaft 873 includes an axial tuning port 881, preferably having a diameter of about 0.687 inches. A tuning mass 883 is a rigid body slidingly disposed within tuning port 881. Tuning mass 883 is preferably a tungsten rod. Tuning mass 883 may be one of at least two different weights: (1) a heavier one for airplane mode operation at 16.6 Hz; and (2) a lighter one for helicopter mode operation at 19.9 Hz. The heavier one would preferably weigh about 1.623 pounds and be made of solid tungsten, except for a fine tuning bore back-filled with epoxy. The lighter one would preferably weight 1.133 pounds and be sheathed with a 0.10 inch thick wall steel sleeve to reduce the volume of tungsten. If upper and lower elastomeric seal members 809 and 810 have an effective diameter of about 6.00 inches, and tuning port 881 has a diameter of about 0.687 inches, the area ratio, or hydraulic ratio, R, is about of 76.3.

An upper guide ring 885 and a lower guide ring 887, each preferably made of brass, align and guide tuning mass 883 as tuning mass 883 slides up and down in tuning port 881 in response to oscillatory forces from the wing member of the aircraft. In addition, upper and lower guide rings 885 and 887 allow activation of an upper one-way bypass port 889 and a lower one-way bypass port 891, depending upon the axial location of tuning mass 883. Upper and lower bypass ports 889 and 891 prevent overtravel of the tuning mass during large changes in steady or quasisteady loads, such as would occur during ground-air-ground cycles or maneuvers. Upper and lower bypass ports 889 and 891 provide fluid communication between upper and lower fluid chambers 831 and 837, and allow the liquid pressures in upper and lower fluid chambers 831 and 837 to equalize when the amplitude of the oscillatory motion of tuning mass 883 is sufficiently large, thereby limiting the amplitude of tuning mass 883. Thus when guide rings 885 and 887 travel beyond the closest bypass port 889 or 891, the pressures in upper and lower fluid chambers 831 and 837 equalize and the velocity of tuning mass 883 peaks.

One-way flapper valves (not shown) are located in the bypass passage and cover the backside of bypass ports 889 and 891. The bypass passages and associated one-way flapper valves act to center the oscillating tuning mass 883 axially within tuning port 881.

Figure 9:
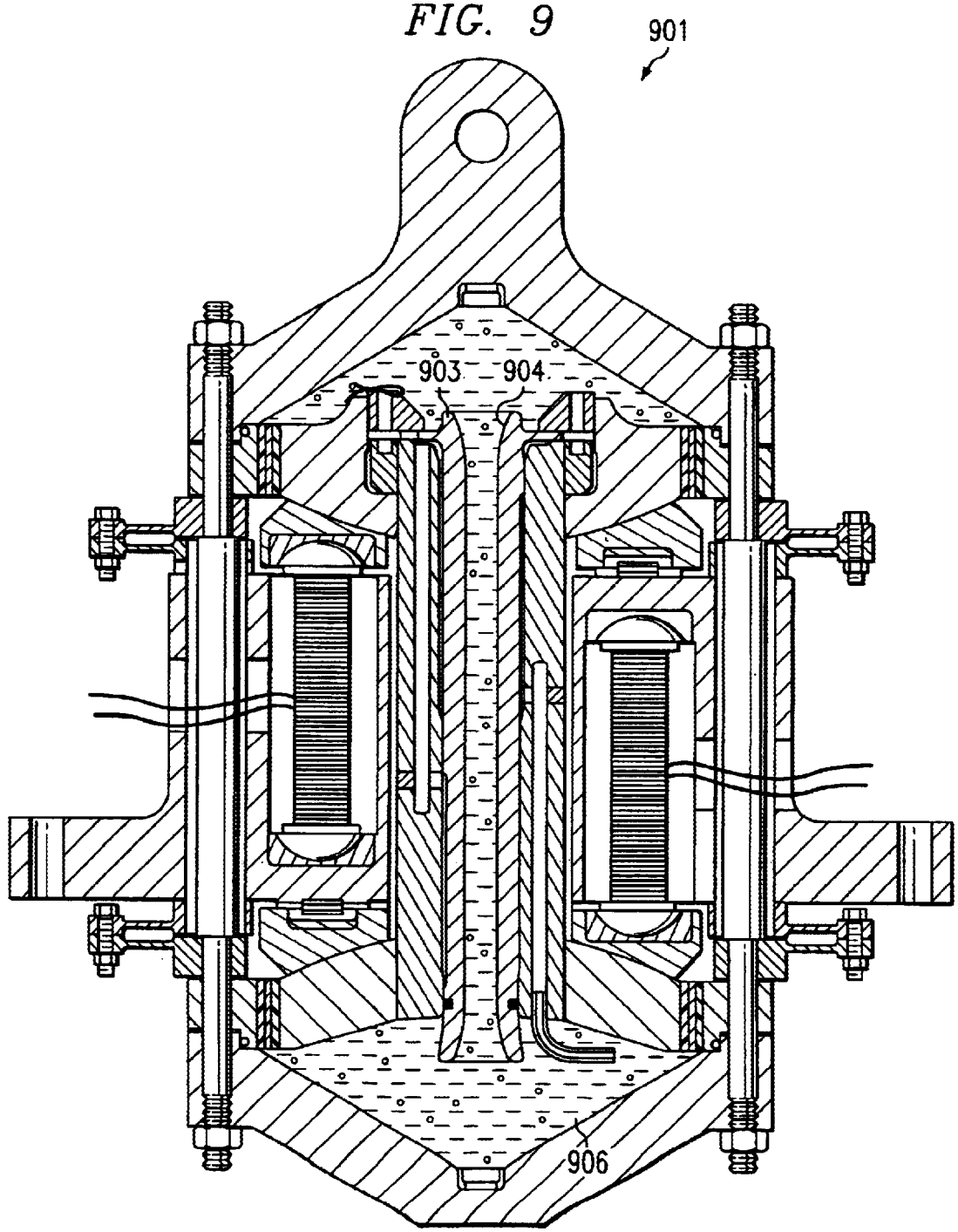
FIG. 9 is a cross-sectional view of the an alternate embodiment of the tunable vibration isolator according to the present invention.

Referring now to FIG. 9 in the drawings, an alternate embodiment of a physical configuration of a vibration isolator 901 according to the present invention is illustrated in a cross-sectional view. All of the components of vibration isolator 901 are identical in form and function as the components of vibration isolator 801, with the exception that tubular shaft 873 and tuning mass 883 has been replaced with a tubular flow port 903. Tubular flow port 903 includes a central tuning passage 904. Tubular flow port 903 is configured to seal off upper and lower bypass valves 889 and 891. No solid tuning mass is necessary in vibration isolator 901. In other words, vibration isolator 801 uses a solid tuning mass approach, and vibration isolator 903 uses a liquid tuning mass approach.

It is preferred that the diameter of central tuning passage 904 is about 2.275 inches, making the area ratio, or hydraulic ratio, R, for liquid tuning mass equal to 360. This amplification ratio may result in high viscous damping due to the high fluid velocity. However, this approach offers a reduced complexity design.

In the liquid tuning mass approach of FIG. 9, tuning fluid 906 is preferably a fluid which is organic with non-corrosive properties, low viscosity, and high density. The silicone oil which is preferred in the solid tuning mass approach of FIG. 8 is not used in the liquid tuning mass approach because the organic liquid has twice the density, i.e., specific gravity of about 1.78 in lieu of about 0.916 for silicone, with slightly less viscosity, i.e., 3.3 centipoise in lieu of 5.0 centipoise for silicone. Although the organic liquid's lubricity properties are not as good as silicone oil, there is no need for good lubricity because there are no sliding parts in the liquid tuning mass approach.

Figure 10:
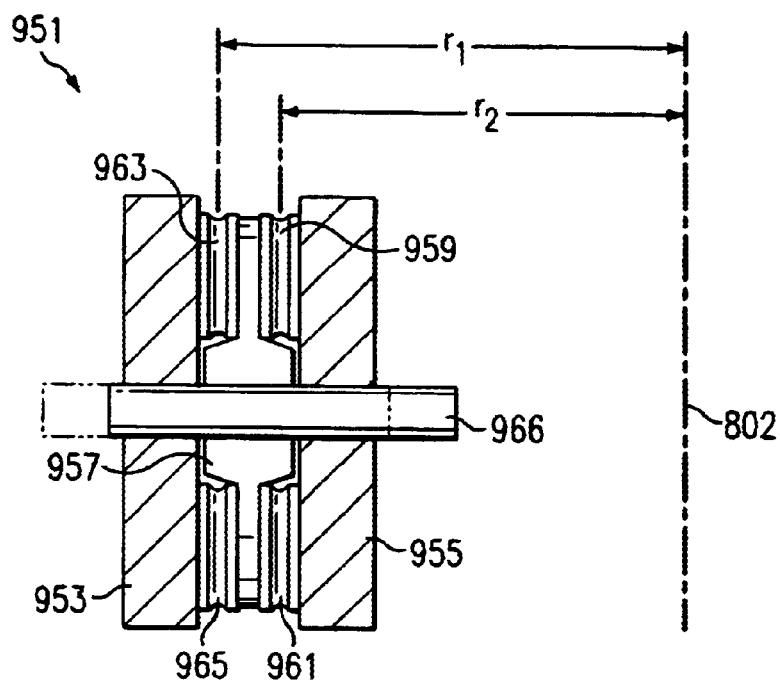
FIG. 10 is a cross-sectional view of a frequency step change mechanism for use with the vibration isolator according to the present invention.

Referring now to FIG. 10 in the drawings, a frequency step change mechanism 951 is illustrated. Frequency step change mechanism 951 allows step tuning for treating principal vibration at 16.6 Hz and 19.9 Hz. Frequency step change mechanism 951 may be used instead of upper and lower elastomeric seal members 809 and 810. Frequency step change mechanism 951 includes an outer housing 953, an inner housing 955, and an intermediate ring 957. An inner-upper elastomer 959 and an inner-lower elastomer 961 are disposed between inner housing 955 and intermediate ring 957. An outer-upper elastomer 963 and an outer-lower elastomer 965 are disposed between inner housing 955 and intermediate ring 957. A shuttle pin 966 locks intermediate ring 957 to either inner housing 955 or outer housing 953. When locked to inner housing 955, the effective piston radius is $r_1$. When locked to outer housing 953, the effective piston radius is $r_2$. For example, with the liquid tuning approach of FIG. 9, the tuning passage diameter is 0.316 inches. The outer piston radius, $r_1$, is 3.00 inches (area ratio R=360.5) providing a passive (open-loop) isolation frequency of 16.6 Hz. To increase the isolation frequency to 19.9 Hz, the area ratio, R, must be decreased to approximately 300. This can be accomplished by sliding shuttle pin 965 radially inward, thereby locking out outer-upper and outer-lower elastomers 963 and 965, and releasing inner-upper and inner-lower elastomers 959 and 961, so that the piston radius becomes $r_2$. With a separation between the inner and outer elastomers of 0.26 inch, the piston radius becomes 2.74 inches, decreasing the area ratio, R, to 300.8.

Figure 11:
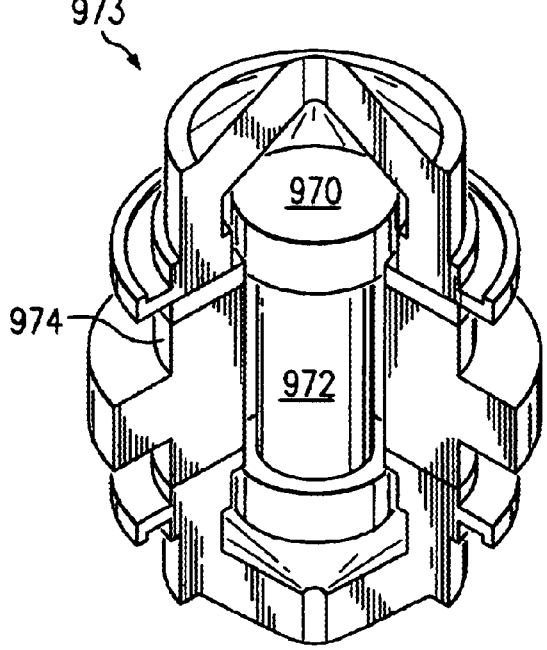
FIG. 11 is a perspective view of a fluid structure model of the vibration isolator according to the present invention.

Referring now to FIG. 11 in the drawings, a coupled fluid structure model of the vibration isolator 973 of the present invention is illustrated. A computer generated analytical model of vibration isolator 973 was created and analyzed to determine the driving point stiffness at the active tuning element input. The static stiffness of vibration isolator 973 was analyzed by fixing a tuning mass 970 to a piston 972. An actuation force was applied across stack actuators 974, and the driving point displacement was calculated. From this analysis, the driving point stiffness was determined to be about $3.97 \times 10^6$ pounds per inch. The total axial stiffness of the six piezoceramic actuators alone is about $3.03 \times 10^6$ pounds per inch. Thus, the efficiency may be reduced because some of the actuator motion may be used to elastically strain the structure of vibration isolator 973, rather than providing useful work in accelerating tuning mass 972.

Figure 12:
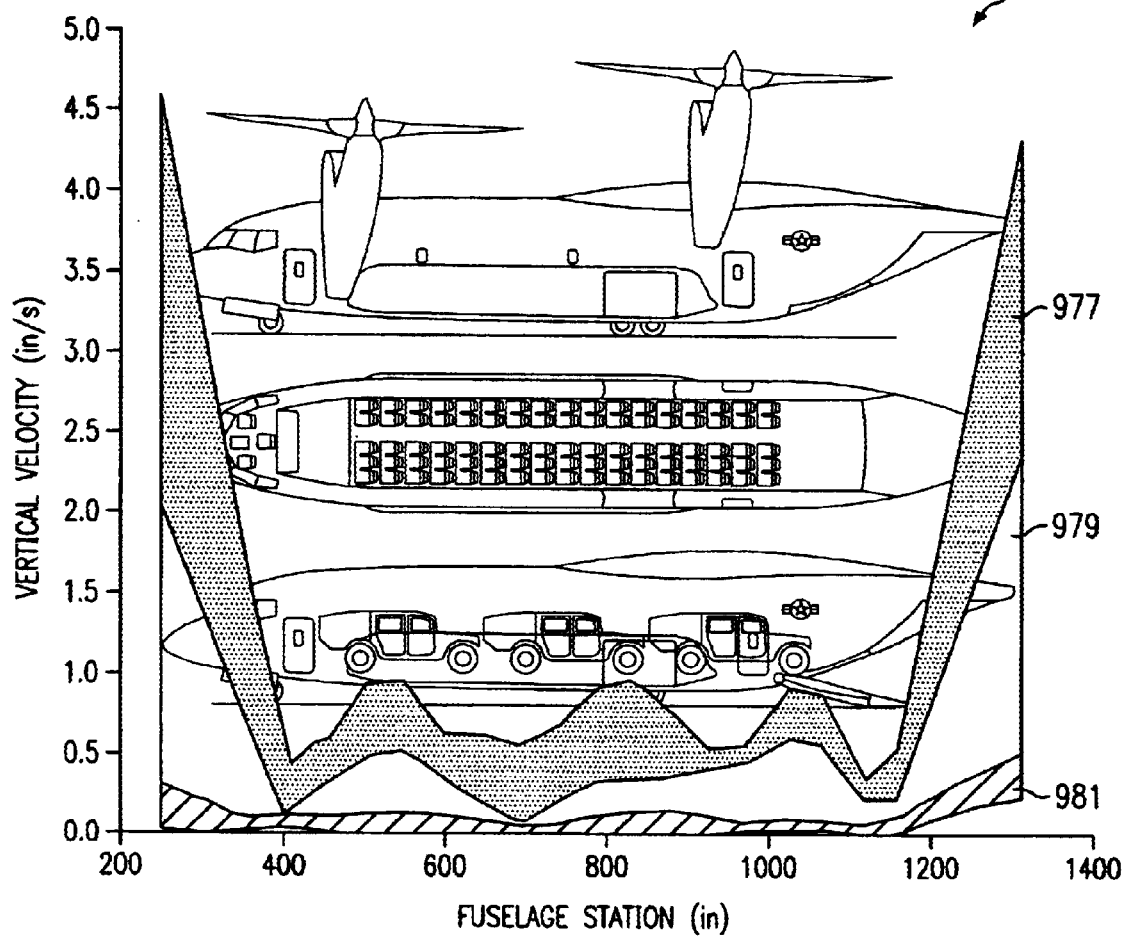
FIG. 12 is a plot of vertical velocity versus fuselage station for the tunable vibration isolator according to the present invention.

Referring now to FIG. 12 in the drawings, a computer generated plot 975 of vertical velocity versus fuselage station for the tunable vibration isolator according to the present invention, as used on quad tilt rotor aircraft 211 of FIG. 3, is illustrated. Plot 975 shows the fuselage vibration envelope for the vibration isolator of the present invention. Region 977 is a baseline region representing no vibration isolation; region 979 is a passive region representing vibration isolation without active tuning having; and region 981 represents an active region with active tuning of vibration isolation.

It is apparent that an invention with significant advantages has been described and illustrated. Although the present invention is shown in a limited number of forms, it is not limited to just these forms, but is amenable to various changes and modifications without departing from the spirit thereof.

We claim:

1. A vibration isolator comprising:
   a housing defining a fluid chamber;
   a fluid disposed within the fluid chamber;
   a piston resiliently disposed within the housing;
   a means for resiliently coupling the piston to the housing;
   a tuning mass operably associated with the piston;
   a first set of three active tuning elements operating in a generally axial direction upon a first concave plate member, such that the forces of the first set of three active tuning elements are balanced; and
   a second set of three active tuning elements operating in an opposing generally axial direction upon a second concave plate member, such that the forces of the second set of three active tuning elements are balanced;
   wherein each active tuning element is configured with convex surfaces to matingly couple with the first concave plate member and the second concave plate member, such that the balanced forces from the first and second sets of three active tuning elements are transferred to the piston.

2. The vibration isolator according to claim 1, wherein the piston divides the fluid chamber into two volumes and a port passes through the piston such that the two volumes are in fluid communication.

3. The vibration isolator according to claim 2, wherein the port passes axially through the piston.

4. The vibration isolator according to claim 2, wherein the port is configured to eliminate large mean pressure shifts between the two volumes.

5. The vibration isolator according to claim 2, wherein the tuning mass is a rigid body slidingly disposed within the port.

6. The vibration isolation system according to claim 5, wherein the rigid body is a tungsten rod.

7. The vibration isolation system according to claim 5, wherein the fluid is a silicone oil.

8. The vibration isolation system according to claim 2, wherein the tuning mass is a tuning fluid.

9. The vibration isolation system according to claim 8, wherein the tuning fluid is an organic fluid having non-corrosive properties, low viscosity, and high density.

10. The vibration isolator according to claim 1, wherein the housing is coupled to an isolated object.

11. The vibration isolator according to claim 1, wherein the piston is coupled to an isolated object.

12. The vibration isolator according to claim 1, wherein each active tuning element comprises:

an actuation piston for selectively actuating the fluid;

an actuator coupled to the actuation piston; and a control system for controlling the actuation of the actuator.

13. The vibration isolator according to claim 12, wherein the actuator is a piezoceramic material.

14. The vibration isolator according to claim 12, wherein the actuator is a magnetostrictive material.

15. The vibration isolator according to claim 12, wherein the actuator is electromagnetic.

16. The vibration isolator according to claim 12, wherein the actuator is a pneumatic actuator.

17. The vibration isolator according to claim 12, wherein the actuator is a hydraulic actuator.

18. The vibration isolator according to claim 5, further comprising:

a plurality of bypass valves operably associated with the piston to prevent overtravel of the tuning mass during large changes in loads.

19. The vibration isolator according to claim 1, further comprising:

a means for preventing non-axial movement of each active tuning element.

20. The vibration isolator according to claim 19, wherein the means for preventing non-axial movement of each active tuning element comprises:

a flexure disposed between the housing and the active tuning element.

21. The vibration isolator according to claim 19, wherein the means for preventing non-axial movement of each active tuning element comprises:

hemispherical end caps disposed on each end of the active tuning element;

receivers coupled to the piston and the housing, the receivers being configured to matingly receive the hemispherical end caps; and an elastomeric material disposed between the hemispherical end caps and the receivers for absorbing moments generated by the active tuning element.

22. The vibration isolator according to claim 1, wherein the means for resiliently coupling the piston to the housing comprises:

an elastomer coupled to the piston and the housing.

23. The vibration isolator according to claim 1, wherein the means for resiliently coupling the piston to the housing is a frequency step change assembly comprising:

an annular outer member adapted for coupling to the housing;

an annular inner member adapted for coupling to the piston;

an intermediate member disposed between the outer member and the inner member;

a first annular elastomeric member disposed between the outer member and the intermediate member, the first annular elastomeric member having a first radius;

a second annular elastomeric member disposed between the inner member and the intermediate member, the second annular elastomeric member having a second radius a locking mechanism for switching between:

a first frequency mode in which the outer member, the first elastomeric member, and the intermediate member are coupled together such that the effective piston radius is the first radius and the vibration isolator operates at a first isolation frequency; and a second frequency mode in which the inner member, the second elastomeric member, and the intermediate member are coupled together such that the effective piston radius is the second radius and the vibration isolator operates at a second isolation frequency.

24. The vibration isolator according to claim 23, wherein the first isolation frequency is about 16.6 Hertz, and the second isolation frequency is about 19.9 Hertz.

* * * * *